US012711371B2

(12) United States Patent
Lui et al.

(10) Patent No.: US 12,711,371 B2
(45) Date of Patent: Aug. 18, 2026

(54) SYSTEM AND METHOD FOR NEURAL TIME SERIES PREPROCESSING

(71) Applicant: ROYAL BANK OF CANADA, Toronto (CA)

(72) Inventors: Yik Chau (Kry) Lui, Toronto (CA); Danlan Chen, Toronto (CA); Bo Chang, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 1004 days.

(21) Appl. No.: 17/307,697

(22) Filed: May 4, 2021

(65) Prior Publication Data

US 2021/0342691 A1 Nov. 4, 2021

Related U.S. Application Data

(60) Provisional application No. 63/019,659, filed on May 4, 2020.

(51) Int. Cl.
*G06N 3/08* (2023.01)
*G06F 18/10* (2023.01)
*G06F 18/21* (2023.01)
*G06F 18/214* (2023.01)

(52) U.S. Cl.
CPC ............... *G06N 3/08* (2013.01); *G06F 18/10* (2023.01); *G06F 18/2148* (2023.01); *G06F 18/2163* (2023.01)

(58) Field of Classification Search
CPC .......... G06N 3/08; G06N 3/044; G06N 3/045; G06F 18/10; G06F 18/214; G06F 18/21; G06F 18/24133
See application file for complete search history.

(56) References Cited

U.S. PATENT DOCUMENTS

| | | | | |
|---|---|---|---|---|
| 5,461,699 | A * | 10/1995 | Arbabi | G06N 3/04 706/21 |
| 7,716,011 | B2 * | 5/2010 | Thibaux | H04L 63/1425 702/179 |
| 8,631,040 | B2 * | 1/2014 | Jackson | G06F 16/2445 707/791 |
| 10,410,113 | B2 * | 9/2019 | Clayton | G06N 3/044 |

(Continued)

OTHER PUBLICATIONS

Laptev, N. et al., Time-series extreme event forecasting with neural networks at uber. ICML 2017 Time Series Workshop, International Conference on Machine Learning, Sydney, Australia.

(Continued)

*Primary Examiner* — Phenuel S Salomon
(74) *Attorney, Agent, or Firm* — NORTON ROSE FULBRIGHT CANADA LLP

(57) ABSTRACT

Systems and methods for neural time series preprocessing and forecasting, dividing time series data to generate chunks of short time series, inputting each of the short time series to a data preprocessing neural network that includes differencing to transform non-stationary data to stationary data and to filter noise, generating and outputting, from the data preprocessing neural network, processed time series data, and inputting the processed time series data to a forecasting neural network. Parameters of the data preprocessing neural network and parameters of the forecasting neural network are learned end-to-end.

20 Claims, 6 Drawing Sheets

(56) References Cited

U.S. PATENT DOCUMENTS

| | | | | |
|---|---|---|---|---|
| 11,062,802 | B1* | 7/2021 | McNair | G16H 50/30 |
| 2003/0140023 | A1* | 7/2003 | Ferguson | G06Q 30/02 706/15 |
| 2016/0342453 | A1* | 11/2016 | Khan | G06F 11/0793 |
| 2017/0249534 | A1* | 8/2017 | Townsend | G06V 10/82 |
| 2018/0225391 | A1* | 8/2018 | Sali | G06F 7/588 |
| 2018/0261319 | A1* | 9/2018 | Bowie | G16H 40/20 |
| 2020/0219008 | A1* | 7/2020 | Franceschi | G06N 7/01 |
| 2020/0250573 | A1* | 8/2020 | Kajino | G06N 3/084 |
| 2020/0380335 | A1* | 12/2020 | Neznal | G06N 3/044 |
| 2021/0326696 | A1* | 10/2021 | Kim | G06N 3/0442 |

OTHER PUBLICATIONS

Smyl, S., A hybrid method of Exponential Smoothing and Recurrent Neural Networks for time series forecasting, Uber Technologies, International Journal of Forecasting, Mar. 27, 2019.

Cleveland, R. B. et al., STL: A seasonal-trend decomposition procedure based on loess, Journal of Official Statistics, 6(1), pp. 3-33, 1990.

Smyl, S. et al., M4 Forecasting Competition: Introducing a New Hybrid ES-RNN Model, Uber Technologies, https://eng.uber.com/m4-forecasting-competition/.

* cited by examiner

SYSTEM AND METHOD FOR NEURAL TIME SERIES PREPROCESSING

CROSS REFERENCE TO RELATED APPLICATIONS

This application is a non-provisional of, and claims all benefit, including priority, to U.S. Application No. 63/019,659, dated May 4, 2020 entitled SYSTEM AND METHOD FOR NEURAL TIME SERIES PREPROCESSING and incorporated herein in its entirety by reference.

FIELD

This disclosure relates to time series analysis, in particular, preprocessing time series data as input to a neural network for forecasting.

BACKGROUND

Many industries rely on accurate forecasting of time series data to make decisions about the future, such as, financial asset price forecasting, business analytics, traffic forecasting and inventory planning.

Time series data can be defined as a series of data points indexed in time. Forecasting may be performed to predict future values based on previously observed time series values. Time series forecasting may be performed using classical statistical methods or modern machine learning methods such as neural networks.

The inherent complexity and unique properties of time series data (e.g. non-stationarity, self-correlated residuals) lead to challenges in achieving accurate forecasting.

SUMMARY

Data preprocessing techniques may improve the performance of neural network-based time series forecasting.

Two neural time series preprocessing methods are disclosed herein: neural moving average ("Neural MA") and neural locally weighted scatter-plot smoothing ("Neural LOWESS").

According to an aspect, there is provided a computer-implemented method for neural time series preprocessing and forecasting, the method comprising: dividing time series data to generate chunks of short time series; inputting each of the short time series to a data preprocessing neural network that includes differencing to transform non-stationary data to more stationary data and to filter noise; generating and outputting, from the data preprocessing neural network, processed time series data; and inputting the processed time series data to a forecasting neural network, wherein parameters of the data preprocessing neural network and parameters of the forecasting neural network are learned end-to-end.

In some embodiments, the data preprocessing neural network estimates moving weighted averages (where the weights can be negative in some cases) such as moving mean and moving standard deviation for each short (chunked) time series.

In some embodiments, the data preprocessing neural network performs local regression for each short time series.

In some embodiments, the differencing is a kernel scheme where the weights sum up to one, or a differencing scheme, where autoregressive integrated moving average (ARIMA) differencing is a special case.

In some embodiments, the forecasting neural network is a recurrent neural net (RNN), a long short-term memory (LSTM), a temporal convolutional neural networks (CNN) or any other suitable neural nets that can be used for time series forecasting.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will become apparent to those skilled in the art following a reading of the following description in conjunction with the drawings.

BRIEF DESCRIPTION OF DRAWINGS

Embodiments will be described, by way of example only, with reference to the attached figures, wherein in the figures.

It is understood that throughout the description and figures, like features are identified by like reference numerals.

DETAILED DESCRIPTION

Figure 1:
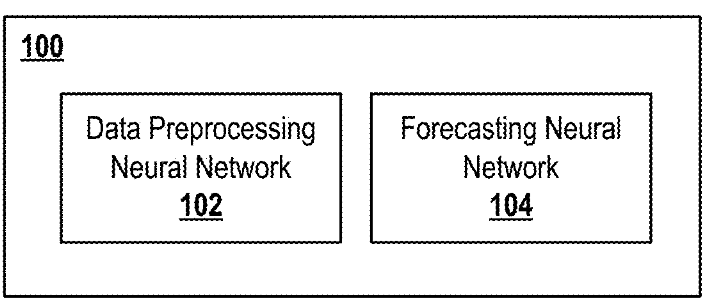
FIG. 1 is a simplified schematic diagram of a system for neural time series preprocessing and forecasting, in accordance with some embodiments.

Embodiments of methods, systems, and apparatus are described through reference to the drawings.

The present disclosure describes two neural time series preprocessing methods: neural moving average (Neural MA) and neural locally weighted scatter-plot smoothing (Neural LOWESS). These pre-processing methods may take any differentiable forecasting model into account while being applicable to many types of preprocessing neural network models for forecasting.

In recent neural time series forecasting literature, it is reported that data preprocessing techniques (e.g. Seasonal and Trend decomposition using Loess (STL decomposition)) are of crucial importance for neural network-based time series forecasting. However, such preprocessing often involves subjective choices of hyper-parameters (such as the weight function) and is not linked to the downstream tasks (i.e. forecasting) in any transparent way.

Herein, a new preprocessing method with learnable weights is provided. This allows for end-to-end differentiable neural time series forecasting, where the preprocessing module processes the data directly for the downstream task. As opposed to certain prior methods that build a similar mechanism for exponential smoothing methods only, the methods described herein work for all neural time series models, hence giving more flexibility by taking advantage of the neural network literature. These are the first such end-to-end differentiable time series processing methods broadly applicable to existing neural time series models.

It should be noted that the exponential smoothing itself is a preprocessing model, and changing its parameter will change its behavior. However, it is still a fixed model class which may not work well with all other forecasting models (e.g. those that do not work well with an exponential smoothing). In other words, there are two concepts of the term model used herein (one model for the preprocessing, and another for forecasting). The teachings herein support any weight smoothing dynamically (a fully flexible preprocessing model). As such, the teachings herein can work with any forecasting model any time (since the preprocessing is fully flexible and it can work with any forecasting model jointly).

Time Series Data

Time series data $X_t$ is a particular kind of stochastic process, where the process is observed at time t, and L denotes the lag operator: $L(X_t)=X_{t-1}$. A differencing operator can be defined as: $\hat{V}(X_t)=(I-L)X_t=X_t-X_{t-1}$, where I is the identity operator.

Time series data may often be decomposed to level, trend, seasonality, and residual components. "Level" can be defined as the average value in the series; "trend" can be defined as the increasing or decreasing value in the series (or more generally, aperiodic functions such as polynomials); "seasonality" can be defined as the repeating short-term cycle in the series, and "residual" can be defined as random variation in the residual time series, which is often a stationary time series itself (e.g. it may follow the distribution of an autoregressive moving average (ARMA) process, but it does not have to).

Previous literature deems time series preprocessing necessary in achieving accurate prediction. Existing preprocessing techniques can be roughly categorized as 1) model-independent, such as differencing used in autoregressive integrated moving average (ARIMA) or Seasonal-Trend Decomposition Procedure Based on Loess (STL decomposition); or as 2) model-dependent, such as Exponential Smoothing-Recurrent Neural Networks (ETS-RNN) method. Model-independent methods suffer from their sub-optimality: preprocessing the time series data is not integrated with the underlying model's forecasting accuracies. While existing model-dependent techniques may consider such issues, the existing approaches are limited to a particular preprocessing model (i.e. exponential smoothing with fixed parameter (after learning)), limiting their broad applicability.

Data Preprocessing

A first step in classical and neural time series analysis is typically data preprocessing.

Data preprocessing techniques (e.g. STL decomposition) may be of crucial importance for neural network-based time series forecasting. However, such preprocessing often involves subjective choices of hyperparameters (such as the weight function) and is not linked to the downstream tasks (i.e. forecasting) in any transparent way.

Data preprocessing techniques disclosed herein introduce learnable weights. Conveniently, this may allow for end-to-end differentiable neural time series forecasting, in which preprocessing techniques process data directly for a downstream task. End-to-end differentiable time series processing techniques disclosed herein may be broadly applicable to neural time series models, including neural networks such as recurrent neural nets (RNN), temporal convolutional neural networks (CNNs), fully connected networks, or other suitable neural networks.

By contrast with a mechanism for exponential smoothing methods only, preprocessing techniques disclosed herein may work for any or all neural time series models, hence providing more flexibility by taking advantage of neural network literature.

Classical wisdom suggests time series data preprocessing may serve at least two purposes: (1) to transform often non-stationary time series data to stationary data where clearer understanding can be leveraged; and (2) to filter noise from the signal data. Preprocessing techniques disclosed herein may achieve these purposes if the preprocessing component preprocesses nonstationary time series data to an approximately stationary one.

However since the preprocessing component disclosed herein works with the forecasting module with an accurate forecast as its objective, it is possible that the processed time series can be less stationary than the classical methods, as long as these two modules end up with better forecast. In this sense, preprocessing and forecasting techniques disclosed herein challenge the conventional wisdom that stationarity based preprocessing methods are always suitable for forecasting.

Differencing

The statistical properties of non-stationary time series data change over time. Differencing can be viewed as a transformation applied to time series data that can make the data more stationary. The properties of stationary time series data do not depend on the time at which the series is observed. For example, stationary time series data's statistical properties, such as mean and variance, remain constant over time.

To difference data, the difference between consecutive observations can be computed:

$$Y_t = X_t - X_{t-1}$$

Differencing can remove changes in the level of a times series, eliminating trend and seasonality, and thereby stabilizing the mean of the time series. Differencing can be generalized in different ways.

Differencing Scheme in ARIMA

A model of an autoregressive integrated moving average (ARIMA) family of models is a generalization of an autoregressive moving average (ARMA) model. The ARIMA family or class of processes or models, after differencing finitely many times, reduce to ARMA processes.

An ARIMA process may be applied in some cases where data show evidence of non-stationarity. A preprocessing differencing step (corresponding to the "integrated" or "I" part of the model) can be applied one or more times to eliminate non-stationarity.

The core stationarizing procedure in an ARIMA process is to perform differencing iteratively d times, which is referred to as an ARIMA-based "differencing scheme", symbolically presented as: $\hat{\nabla}^d T_t = (I-L)^d X_t$.

$X_t$ is subtracted by linear combination of $\{X_{t-1}, \ldots, X_{t-d}\}$ where the linear coefficients follow their corresponding binomial coefficients:

$$\nabla^d Y_t = (I-L)^d X_t = \sum_{i=0}^{d} (-1)^i d_i X_{t-i}$$

However, an ARIMA differencing scheme only transforms non-stationary data to stationary data for a particular family of non-stationarity (e.g. time series that exhibits linear or polynomial trend).

Kernel Scheme

A second way to generalize differencing is to constrain the linear coefficients to obey convex combinations, referred to as a "kernel scheme".

Symbolically, $Y_t = X_t - (\alpha_1 X_{t-1} + \ldots + \alpha_d X_{t-d})$, where all $\alpha_{t-i} \geq 0$ and $$\sum_{i=1}^{d} \alpha_i = 1.$$

The coefficients $\{\alpha_1, \ldots, \alpha_d\}$ are sometimes called the kernel. It can be a uniform weighting method, an exponential weighing, a Gaussian kernel or any other kernels. As an alternative, such parameters can also be estimated in the LOWESS manner. This can be viewed as a cousin to LOWESS nonparametric smoothing. Estimation may be done by maximum likelihood in the least square sense, and thus optimality for forecasting may not be transparent.

Model-Specific De-Trending and De-Seasonality

Another differencing technique is model-specific de-trending and de-seasonality. In other words, preprocessing the time series may depend on a particular model. Processing may be part of the model assumptions, such as using hybrid Exponential Smoothing-Recurrent Neural Networks, referred to as "ETS-RNN" or "ES-RNN", in the M4 competition.

Differencing preprocessing for Gradient Based Learning

In the context of gradient based learning (e.g. deep learning), the differencing techniques described above, including the ARIMA differencing scheme, the kernel scheme, and model-specific de-trending and de-seasonality, may be used to make time series data more stationary and easier to model. Stationary time series data may lead to an easier optimization for stochastic gradient descent (SGD) optimizations.

Learning Coefficients

In some embodiments for data preprocessing disclosed herein, linear coefficients may be learned using deep learning techniques and may adapt for streaming time series data, making the data preprocessing end-to-end differentiable for all deep learning methods (as opposed to model-specific learning such as ETS-RNN) that are suitable for forecasting.

In some embodiments, data preprocessing and forecasting are considered together; preprocessing is optimized for forecasting, as opposed to other statistical criteria, such as maximum likelihood that can be unrelated to forecasting.

FIG. 1 illustrates a system 100 for neural time series preprocessing and forecasting, in accordance with some embodiments. System 100 includes a data preprocessing neural network 102 and a forecasting neural network 104.

Data preprocessing neural network 102 may be configured for neural moving averaging (Neural MA), as described herein, or neural locally weighted scatter-plot smoothing (Neural LOWESS), as described herein.

In some embodiments, forecasting neural network 104 may be a recurrent neural network (RNN), such as a long short-term memory (LSTM) network, a convolutional neural network (CNN), or other suitable neural networks.

With the system 100: 1) hyperparameter tuning is no longer needed in preprocessing, as the coefficients are learnable, which is especially cumbersome for spatial-temporal non-stationary time series data (e.g. electricity usage at different cities over time); 2) preprocessing is not optimized for other statistical criteria that are not linked to forecasting; and 3) while the preprocessing can be learned (vs. differencing in ARIMA), it is also more broadly applicable to larger classes of preprocessing models (vs. ETS-RNN).

Moreover, due to the non-stationary nature of many time series data, the optimal coefficients may change over time. A similar argument applies to learning across different time series, where each series may deserve their own kernels. Thus, hyper-networks may be applied to output the coefficients (e.g. $\{\alpha_1, \ldots, \alpha_d\}$ in kernel differencing) dynamically over time and across different time series, depending on the input time series data and/or previous states.

Figure 2:
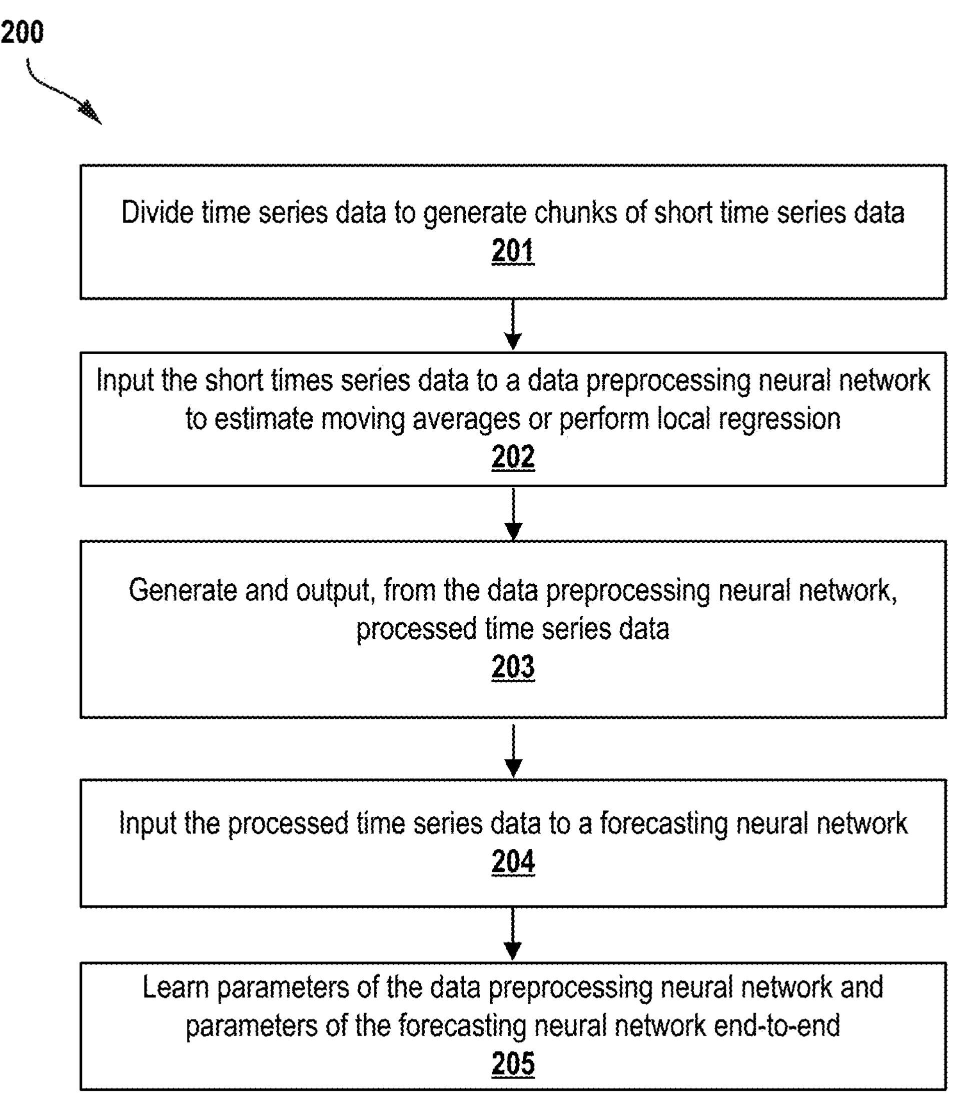
FIG. 2 is a flow chart of a method for neural time series preprocessing and forecasting, in accordance with some embodiments.

FIG. 2 illustrates a flow chart of a method 200 for neural time series preprocessing and forecasting, in accordance with some embodiments. The steps are provided for illustrative purposes. Variations of the steps, omission or substitution of various steps, or additional steps may be considered.

At block 201, time series data is divided into chunks of short time series data.

At block 202, each of the short time series data is input to a data preprocessing neural network, such as data preprocessing neural network 102 (Neural MA or Neural LOWESS), to estimate moving averages such as moving mean and moving standard deviation for each short time series, or perform local regression for each short time series. Examples of such preprocessing are described in more detail below.

At block 203, processed time series data is generated and output from the data preprocessing neural network. This is described in more detail below.

At block 204, the processed time series data is input to a forecasting neural network, such as forecasting neural network 104. This is described in more detail below.

At block 205, parameters of the data preprocessing neural network and parameters of the forecasting neural network are learned end-to-end. End-to-end means the parameters are determined by optimizing a differentiable loss function, via stochastic gradient descent or its derivatives.

It should be understood that one or more of the blocks may be performed in a different sequence or in an interleaved or iterative manner.

To illustrate the power of the methods described herein, consider an e-commerce platform that would like to forecast the demand for each of the stores, for all their products. This is a challenging large scale problem, since these large scale time series vary over time and across different stores and products. Due to the variety of such stores and products, a (different) time series model may be trained for each of the cases above. It is hard to automate this process, largely because each model requires their own preprocessing to deal with their non-stationarity. The pain point is that the preprocessing is not learned, but rather a process involving procedural program and human expertise. As mentioned above, this preprocessing is not performed for the forecasting model in mind; rather it optimizes criterion such as maximum likelihood whose relevance to forecasting is unknown. Training and maintaining such a large amount of models is extremely time consuming. It is in this way that the methods described herein generate a program to preprocess and forecast the time series for each store and every product, using a fully machine learning based approach. This lightens the burden of the time series forecasting practitioners and saves time.

Figure 3:
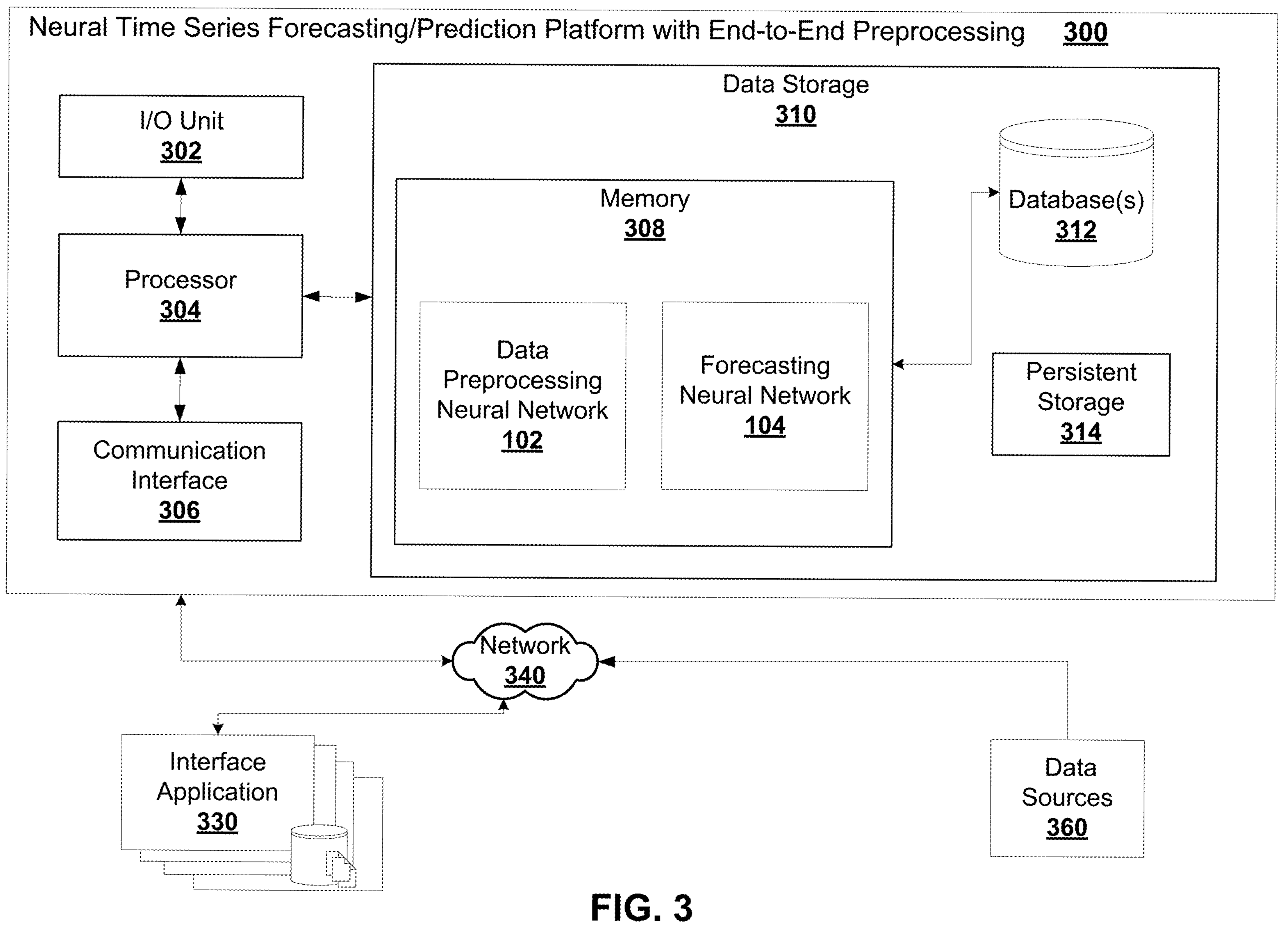
FIG. 3 illustrates, in a schematic diagram, an example of a neural time series forecasting/prediction platform, in accordance with some embodiments.

FIG. 3 illustrates, in a schematic diagram, an example of a neural time series forecasting/prediction platform 300 with end-to-end preprocessing, in accordance with some embodiments. The platform 300 may be an electronic device connected to interface application 330 and data sources 360 via network 340. The platform 300 can implement aspects of the processes described herein.

The platform 300 may include a processor 304 and a memory 308 storing machine executable instructions to configure the processor 304 to receive time series data (e.g. from I/O unit 302 or from data sources 360). The platform 300 can include an I/O Unit 302, communication interface 306, and data storage 310. The processor 304 can execute instructions in memory 308 to implement aspects of processes described herein.

The platform 300 may be implemented on an electronic device and can include an I/O unit 302, a processor 304, a communication interface 306, and a data storage 310. The platform 300 can connect with one or more interface applications 330 or data sources 360. This connection may be over a network 340 (or multiple networks). The platform 300 may receive and transmit data from one or more of these via I/O unit 302. When data is received, I/O unit 302 transmits the data to processor 304.

The I/O unit 302 can enable the platform 300 to interconnect with one or more input devices, such as a keyboard, mouse, camera, touch screen and a microphone, and/or with one or more output devices such as a display screen and a speaker.

The processor 304 can be, for example, any type of general-purpose microprocessor or microcontroller, a digital signal processing (DSP) processor, an integrated circuit, a field programmable gate array (FPGA), a reconfigurable processor, or any combination thereof.

The data storage 310 can include memory 308, database(s) 312 and persistent storage 314. Memory 308 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 310 can include memory 308, databases 312, and persistent storage 314.

The communication interface 306 can enable the platform 300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 300 can be operable to register and authenticate users (using a login, unique identifier, and password for example) prior to providing access to applications, a local network, network resources, other networks and network security devices. The platform 300 can connect to different machines or entities.

The data storage 310 may be configured to store information associated with or created by the platform 300. Storage 310 and/or persistent storage 314 may be provided using various types of storage technologies, such as solid state drives, hard disk drives, flash memory, and may be stored in various formats, such as relational databases, non-relational databases, flat files, spreadsheets, extended markup files, etc.

The memory 308 may include the data preprocessing neural network 102, and forecasting neural network 104.

Neural Moving Average

In an aspect, time series data is preprocessed using neural moving averaging. A problem setup can assume the input time series is $X_{1:T}=(X_1, \ldots, X_T)$ and a desire to forecast $X_{T+1}$. Note that $X_{1:T}$ is usually a non-stationary time series.

Neural Moving Average—Univariate Time Series

A univariate time series can be defined as a time series having only one random variable observed over time, or only a single variable is recorded. For a multivariate time series, multiple variables vary over time or more than one variable is considered.

In a neural moving average implementation, $X_{i+1:i+d}$ is assumed approximately stationary for d<<T, in other words, $X_{1:T}$ is approximately locally stationary. This assumption allows for moving averages to be estimated, such as mean and standard deviation for a short chunk of a time series.

In some embodiments, the approximately local stationarity assumption is not needed for its practical implementation. Hence the methods are still applicable.

Embodiments of neural moving averaging will now be illustrated with the kernel scheme.

The first moment of the time series can be stationarized by:

$$y_t = x_t - \hat{\mu}_t$$

where $$\hat{\mu}_t = \sum_{i=1}^{d} \alpha_i x_{t-i}$$

and $\alpha=(\alpha_1, \ldots, \alpha_d)$, since $\alpha$ is time invariant. $\hat{\mu}_t$ is the moving mean, with parameters $\alpha$ learnable and $$\sum_{i=1}^{d} \alpha_i = 1.$$

Optionally, the second moment of the time series can be stationarized by:

$$z_t = \frac{y_t}{\hat{\sigma}_t + \epsilon}$$

where $$\hat{\sigma}_t = \sqrt{\sum_{i=1}^{d} \beta_i (x_{t-i} - \hat{\mu}_t)^2},$$

with parameters $\beta=(\beta_1, \ldots, \beta_d)$ learnable since $\beta$ is time invariant, and $$\sum_{i=1}^{d} \beta_i = 1$$

and $\epsilon$ is a small number acting as a numerical stabilizer. This is a direct generalization of a stationarizing technique in classical time series such as the one in ARIMA, where subtraction is only from the last data point: $y_t=x_t-x_{t-1}$.

The above can be considered as a generalization of a LOWESS nonparametric smoothing technique when LOWESS regressors are restricted to constant functions, where kernel parameters $\alpha$ and $\beta$ are both learnable.

By contrast to LOWESS, which runs a linear regression locally (having at least both intercept and slope), the above only computes a moving (weighted) mean. Extension to the more general neural LOWESS is described below. In some embodiments, LOWESS parameters are estimated by least squares and parameters are learnt end-to-end with a downstream task.

A differencing scheme such as ARIMA may be performed similarly to the kernel scheme described above, with the exception that the weights can become negative and there is no obvious second moment to compute. Thus, only first moment operation may be performed for such scheme.

Neural Moving Average—Use with Other Forecasting Methods

A moving z-score neural moving average normalized time series can be denoted as $Z_{k+1:T}$, as described above, and can be fed to an autoregressive model such as long short-term memory (LSTM) for prediction. Other forecasting neural networks can be used in place of LSTM. LSTM may be selected for presentation due to its popularity and simplicity.

Figure 4:
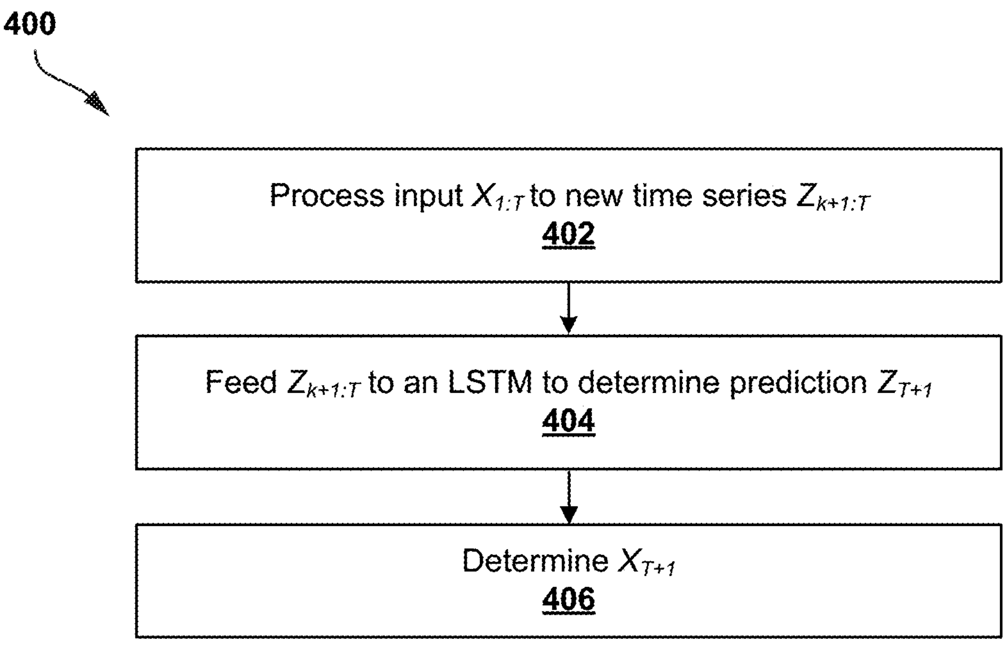
FIG. 4 illustrates, in a flowchart, an example of a method of time series forecasting using neural moving average, in accordance with some embodiments.

FIG. 4 illustrates, in a flowchart, an example of a method of time series forecasting using neural moving average 400, in accordance with some embodiments. In an example, to predict $X_{T+1}$ given $X_{1:T}$, the following steps may be followed:

In block 402: Given input $X_{1:T}$, assuming a moving window size is k, the input can be processed, following the neural moving average method described above, to a new times series: $Z_{k+1:T}$.

In block 404: $Z_{k+1:T}$ can be fed to an LSTM to determine prediction $Z_{T+1}$.

In block 406 $x_{T+1}$ is determined. Since $Z_{1:T}$ is subtracted by mean and divided by standard deviation, the process is inverted:

$$x_{T+1} = z_{T+1}\hat{\sigma}_{T+1} + \hat{\mu}_{T+1} = z_{T+1}\sqrt{\sum_{i=1}^{d} \beta_i (x_{T-i+1} - \hat{\mu}_{T+1})^2} + \sum_{i=1}^{d} \alpha_i x_{T-i+1}. \quad (1)$$

Note that while the kernel parameters $\alpha$ and $\beta$ are the same across this time series, the moving input $x_t$ changes across time. This is reminiscent to the momentum of the time series, i.e. recent past values play a role in forecasting.

Therefore, the kernel parameters $\alpha$ and $\beta$ are given two tasks: approximately stationarize the time series $X_{1:T}$ so that LSTM can forecast based on the autocorrelation of the residual time series $Z_{T-d+1:T}$ and learning the weighting scheme for forecasting $X_{T+1}$ in the original space, via this momentum effect.

Neural Moving Average—Multivariate Time Series

The techniques above can be extended to multivariate time series by application to each individual univariate time series, similar to decomposition. During the preprocessing The neural moving average method normalizes each locally stationary chunk of the time series to have zero mean and unit variance, and hence giving equal scales to the marginal distributions over time.

In some embodiments, the relations or dependency for a cross section of the joint distribution as well as the auto-correlation over time will be handled by a forecasting model such as an LSTM, but the LSTM no longer needs to care about the varying scales across the time series and over time. In other words, the learning task is decomposed into two parts: a structured component which is the neural moving average and a forecasting component such as LSTM.

Dynamic Neural Moving Average

As described above, $\alpha$ and $\beta$ are learnable parameters but they are fixed once learning is finished. A typical time series dataset consists of data across many time series, and since each time series can have wildly varying auto-correlation structure over time, there may not be a single $\alpha$ or $\beta$ that suits each time series. Thus, a hyper-network may be implemented to output different $\alpha$ and $\beta$ depending on each input time series. A neural network whose parameters are outputs of another neural network is termed "hyper-network". It is in this sense that the dynamic neural moving average method can cover any preprocessing model for forecasting (as opposed to exponential smoothing, for example), as long as the hyper-network offers such capacity.

Heuristically, the dynamic neural moving average can take a peek at the input time series first (or any other contextual information; for example, consider forecasting electricity usage in multiple cities, where the city location may be provided as contextual data) and decide on how it wants to weigh the past observations. Once the kernels are decided, it will normalize the time series depending on this time series itself.

In some embodiments, learnable but fixed parameters $\alpha$ and $\beta$ are long term memories and they do not change depending on input. In some embodiments, $\alpha$ and $\beta$ are outputs by a neural network and serve as short term memories that depend on the particular input time series. In some embodiments, both long term (fixed) and short term (dynamic) memories can be used together.

Thus, $\alpha$ and $\beta$ can be input dependent.

The first moment of a time series can be preprocessed by $y_t=x_t-\hat{\mu}_t$, where $$\hat{\mu}_t = \sum_{i=1}^{d} \alpha_i (x_{t-d:t}; \theta) x_{t-i} \quad (2)$$

$\hat{\mu}_t$ is the moving mean, with parameters α input dependent and $$\sum_{i=1}^{d} \alpha_i(x_{t-d:t}; \theta) = 1 \tag{3}$$

The notation $\alpha(x_{t-d:t}; \theta)$ means that the parameters are themselves outputs/activities of a neural network, whose parameters are θ.

Optionally, the second moment of the time series can be stationarized by:

$$z_t = \frac{y_t}{\hat{\sigma}_t + \epsilon}$$

where $$\hat{\sigma}_t = \sqrt{\sum_{i=1}^{d} \beta_i(x_{t-d:t}; \phi)(x_{t-i} - \hat{\mu}_t)^2},$$

with parameters $\beta_i(x_{t-d:t}; \varphi)$ learnable and $$\sum_{i=1}^{d} \beta_i(x_{t-d:t}; \phi) = 1$$

and ϵ is a small number acting as a numerical stabilizer. The notation $\beta(x_{t-d:t}; \varphi)$ means that the parameters are themselves outputs/activities of a neural network, whose parameters are φ.

Inhomogeneous Times Series and Local Trends

In some embodiments, neural moving average techniques disclosed herein can be extended to handle inhomogeneous time series having uninform arrival time stamps. The arrival times can be come inputs of a hyper-network in dynamic neural LOWESS implementation.

Neural LOWESS

In another aspect, time series data is preprocessed using neural locally weighted scatter-plot smoothing (Neural LOWESS).

A problem setup is that input time series is $X_{t_1:t_T} = (X_{t_1}, \ldots, X_{t_T})$ is used to forecast $X_{t_{T+1}}$, where $X_{t_1:t_T}$ is usually a non-stationary time series.

Note that $\{t_1, \ldots, t_T\}$ may be non-uniformly sampled over time. Conveniently, preprocessing techniques disclosed herein may work for inhomogeneous time series data.

Neural LOWESS—Univariate Time Series

In the neural LOWESS case, it is assumed that $X_{t_{i+1}:t_{i+d}}$ can locally be approximated by a linear regression for d<<T, in other words, $X_{t_1:t_T}$ locally exhibits approximately linear trend. This assumption allows local regression to be performed for a short chunk of a time series.

Embodiments of neural LOWESS will now be illustrated.

The first moment of the time series can be preprocessed by:

$$y_{t_{i+1}} = x_{t_{i+1}} - \left(\hat{\alpha}_{t_i} + \hat{\beta}_{t_i} t_{i+1}\right)$$

where $$\hat{\beta}_{t_i} = \left[\left(T_{t_{i+1}:t_{i+d}} - \overline{T}\right)^T W \left(T_{t_{i+1}:t_{i+d}} - \overline{T}\right)\right]^{-1} \left(T_{t_{i+1}:t_{i+d}} - \overline{T}\right)^T W \left(X_{t_{i+1}:t_{i+d}} - \overline{X}\right) \tag{4}$$

which is a weighted least square estimate and $T_{t_{i+1}:t_{i+d}} = (t_{i+1}, \ldots, t_{i+d})$, and $\hat{\alpha}_{t_i} = \overline{X} - \hat{\beta}_{t_i}\overline{T}$.

Here the subscript is dropped and $\overline{T}$ is used to denote sample mean when the context can be inferred:

$$\overline{T} = 1 * \frac{1^T T_{t_{i+1}:t_{i+d}}}{d}$$

where 1 is d dimensional vector filled with scalar 1. The same rule can be applied to $\overline{X}$. Thus $(\hat{\alpha}_{t_i}, \hat{\beta}_{t_i})$ is the moving intercept and slope that define the moving local linear function, with parameters W learnable, where learnable means W can change during model training by stochastic gradient descent, but it will stay fixed in test or deployment time.

Optionally, the second moment of the time series can be stationarized by:

$$z_{t_i} = \frac{y_{t_i}}{\hat{\sigma}_{t_i} + \epsilon}$$

where $$\hat{\sigma}_{t_i} = \sqrt{\sum_{j=1}^{d} \left(x_{t_{i-j}} - \left(\hat{\alpha}_{t_i} + \hat{\beta}_{t_i} t_j\right)\right)^2},$$

with the aforementioned learnable parameters and ϵ is a small number acting as a numerical stabilizer. This is standard deviation of the local linear model's residuals in the fitted data.

This produces an output of $(z_{t_1:t_T}, \hat{\alpha}, \hat{\beta}, \hat{\sigma})$. When $z_{t_1:t_T}$ is a not so non-stationary time series, but definitely with zero mean and unit standard deviation ready for classical neural net optimization technique, $(\hat{\alpha}, \hat{\beta}, \hat{\sigma})$ encode the time series mean, slope and standard deviation information.

Traditionally, parameters W in LOWESS can be estimated by some statistical criterion such as maximum likelihood that is not linked to forecasting in a transparent way. In some embodiments herein, parameters W can be learned end-to-end. Parameterization described above adds the weighted least square estimator to the inductive bias. This forces the preprocessing module 102 to take importance of samples and their correlations into account.

The method steps explained in detail above are based on inductive bias from statistics. Alternatively, $(\hat{\alpha}_{t_i}, \hat{\beta}_{t_i})$, as free parameters, can be learned using other suitable techniques.

Neural LOWESS techniques for prediction extended to multivariate and dynamic cases can be achieved in a similar manner to that described above with reference to neural moving average techniques.

In some embodiments, neural moving average is fitting a moving constant. Thus, it may be extended to a neural LOWESS by taking account of local trends that may exist, and may also be configured to handle inhomogeneous time series.

Dynamic Neural LOWESS

A structured design of neural LOWESS will now be described, which dynamically reweighs the samples in a regression according the residual errors magnitudes.

In the above presentation of neural LOWESS, there was one global weight parameter W in the regression slope:

$$\hat{\beta}_{t_i} = [(T_{t_{i+1}:t_{i+d}} - \overline{T})^T W (T_{t_{i+1}:t_{i+d}} - \overline{T})]^{-1} (T_{t_{i+1}:t_{i+d}} - \overline{T})^T W (X_{t_{i+1}:t_{i+d}} - \overline{X}) \quad (5)$$

Here, W is a learnable parameter in training but a fixed one in the test time. In the dynamic case, $$W = W_{static} + W_{dynamic}(X_{t_{i+1}:t_{i+d}}; \theta)$$

where $W_{static}$ is a learnable parameter in training but a fixed one in the test time, same as above, $W_{dynamic}$, on the other hand, is a weight parameter that is the output of another neural network with parameter θ that changes dynamically depending on the streaming input time series ($X_{t_{i+1}:t_{i+d}}$). Its architecture will be described next. Compared to equation (4), Win equation (5) can change dynamically depending on the streaming data in test/deployment time, in addition to being learnable during training time.

Figure 5:
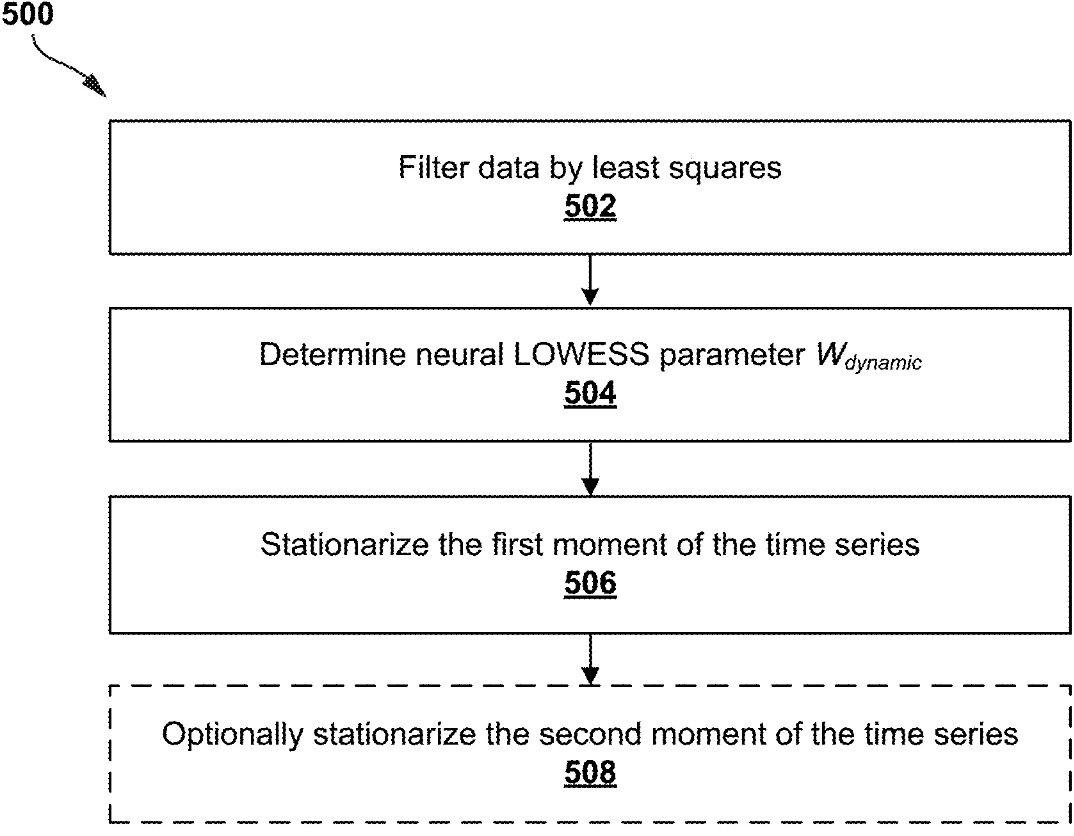
FIG. 5 illustrates, in a flowchart, an example of a method of a time series forecasting using neural LOWESS, in accordance with some embodiments.

FIG. 5 illustrates, in a flowchart, an example of a method of a time series forecasting using neural LOWESS 500, in accordance with some embodiments. In block 502, data is first filtered by ordinary least squares:

$$\epsilon_{t_{i+1}} = x_{t_{i+1}} - (\hat{\alpha}_{t_i}^{OLS} + \hat{\beta}_{t_i}^{OLS} t_{i+1})$$

where $$\hat{\beta}_{t_i}^{OLS} = [(T_{t_{i+1}:t_{i+d}} - \overline{T})^\top (T_{t_{i+1}:t_{i+d}} - \overline{T})]^{-1} (T_{t_{i+1}:t_{i+d}} - \overline{T})^\top (X_{t_{i+1}:t_{i+d}} - \overline{X}) \quad (6)$$

which is the least squares estimate and $T_{t_{i+1}:t_{i+d}} = (t_{i+1}, \ldots, t_{i+d})$, and $$\hat{\alpha}_{t_i}^{OLS} = \overline{X} - \hat{\beta}_{t_i}^{OLS} \overline{T}.$$

In block 504, $W_{dynamic}(\epsilon_{t_{i+1}:t_{i+d}}; \theta))$ is computed. Taking the least squares residuals ($\epsilon_{t_{i+1}:t_{i+d}}$; θ) from block 502 above, as input to another neural network with parameter θ. The output of the neural net is the parameter for neural LOWESS $W_{dynamic}$.

In block 506, the first moment is stationarized:

Stationarize the first moment of the time series by:

$$y_{t_{i+1}} = x_{t_{i+1}} - (\hat{\alpha}_{t_i} + \hat{\beta}_{t_i} t_{i+1})$$

where $$\hat{\beta}_{t_i} = [(T_{t_{i+1}:t_{i+d}} - \overline{T})^T W (T_{t_{i+1}:t_{i+d}} - \overline{T})]^{-1} (T_{t_{i+1}:t_{i+d}} - \overline{T})^T W (X_{t_{i+1}:t_{i+d}} - \overline{X}) \quad (7)$$

which is which is a weighted least square estimate and $T_{t_{i+1}:t_{i+d}} = (t_{i+1}, \ldots, t_{i+d})$, $\hat{\alpha}_{t_i} = \overline{X} - \hat{\beta}_{t_i} \overline{T}$, and the weight is given dynamically depending on the streaming time series input $X_{t_{i+1}:t_{i+d}}$ by $W = W_{static} + W_{dynamic}(\epsilon_{t_{i+1}:t_{i+d}}; \theta)$.

In block 508, optionally, the second moment of the time series is stationarized by:

$$z_{t_i} = \frac{y_{t_i}}{\widehat{\sigma_{t_i}} + \epsilon}$$

where $$\widehat{\sigma_{t_i}} = \sqrt{\sum_{j=1}^{d} (x_{t_{i-j}} - (\hat{\alpha}_{t_i} + \hat{\beta}_{t_i} t_j))^2}$$

where $$\hat{\sigma}_{t_i} = \sqrt{\sum_{j=1}^{d} (x_{t_{i-j}} - (\hat{\alpha}_{t_i} + \hat{\beta}_{t_i} t_j))^2}$$

Method 3—Extended Neural LOWESS

In some embodiments, the Neural LOWESS methods for time series regression may be extended where the target can be quite far into the future, when "rolling" from most recent forecast does not work.

Problem setup: assume that the input time series is $$X_{t_1:t_r} = (X_{t_1}, \ldots, X_{t_r})$$

and it is desired to forecast $X_{t_T+\tau_1}$, $X_{t_T+\tau_2}$, . . . , etc. where $\tau_i$ can be any integer. $X_{t_1:t_T}$ is usually a non-stationary time series. Note that $\{t_1, \ldots, t_T\}$ are non-uniformly sampled over time. Essentially, a preprocessing method is provided that works for inhomogeneous time series regression problems, where the target can be quite far into the future.

Example Use Cases and Implementation

Systems and methods disclosed herein may be applied to data preprocessing and forecasting in a variety of industries that utilize time series data. By way of example, systems and methods disclosed herein may be used to process and forecast financial time series data, electricity usage time series data, and various fields in economics such as energy economics. Techniques disclosed herein may have broad application for many time series.

The above teachings may be tested using simulation data. The following describes one example of a test between a uniform moving average technique known in the prior art, and a dynamic neural LOWESS technique described herein.

Dataset Description

A synthetic dataset may be generated with three added components: a trend component, a seasonality component, and a time series residual component that exhibits strong auto-correlations. The motivation for such generation is because such decompositions fit real world data very well. For example, electricity usage tends to increase over time as population increases (trend component). Electricity usage tends to spike in the summer and winter due to air conditioning (seasonality component). Electricity usage can have an auto-correlation (auto-correlated time series component): days of high usage tend to be followed by days of high usage, as is the case for a cold winter. In fact, such empirical observations are probably the reasons for the success of STL decomposition in the statistics literature.

Uniform Moving Average Technique

Time series practitioners often preprocess the time series by hand, and a popular way to normalize it is uniform moving average. After preprocessing, the processed residual time series is fed to a LSTM network, whose task is to forecast the residual time series. In test time, the forecast is performed by adding the previous moving average and the residual time series forecast by LSTM.

Dynamic Neural LOWESS Technique

To make the comparison fair, the residual time series model used is also a LSTM. However, the time series is processed in an end-to-end manner, where the preprocessing is done by another network that works together with the LSTM. For illustration, the dynamic neural moving average machine and process described above was used. In test time, the forecast is performed by adding the previous dynamic neural moving average and the residual time series forecast by LSTM.

Evaluation Criterion

Both models were trained and evaluated on an identical dataset, where the time series was divided into two parts by time. The first part is used for training and the second part is for evaluation. The evaluation is done on a streaming fashion. More specifically, in test time, a rolling window of ground truth past data is fed to the trained models, and produce the forecast pointwise. By evaluating 64 points in the test time, forecast curves were produced.

Results and Comparison

Figure 6:
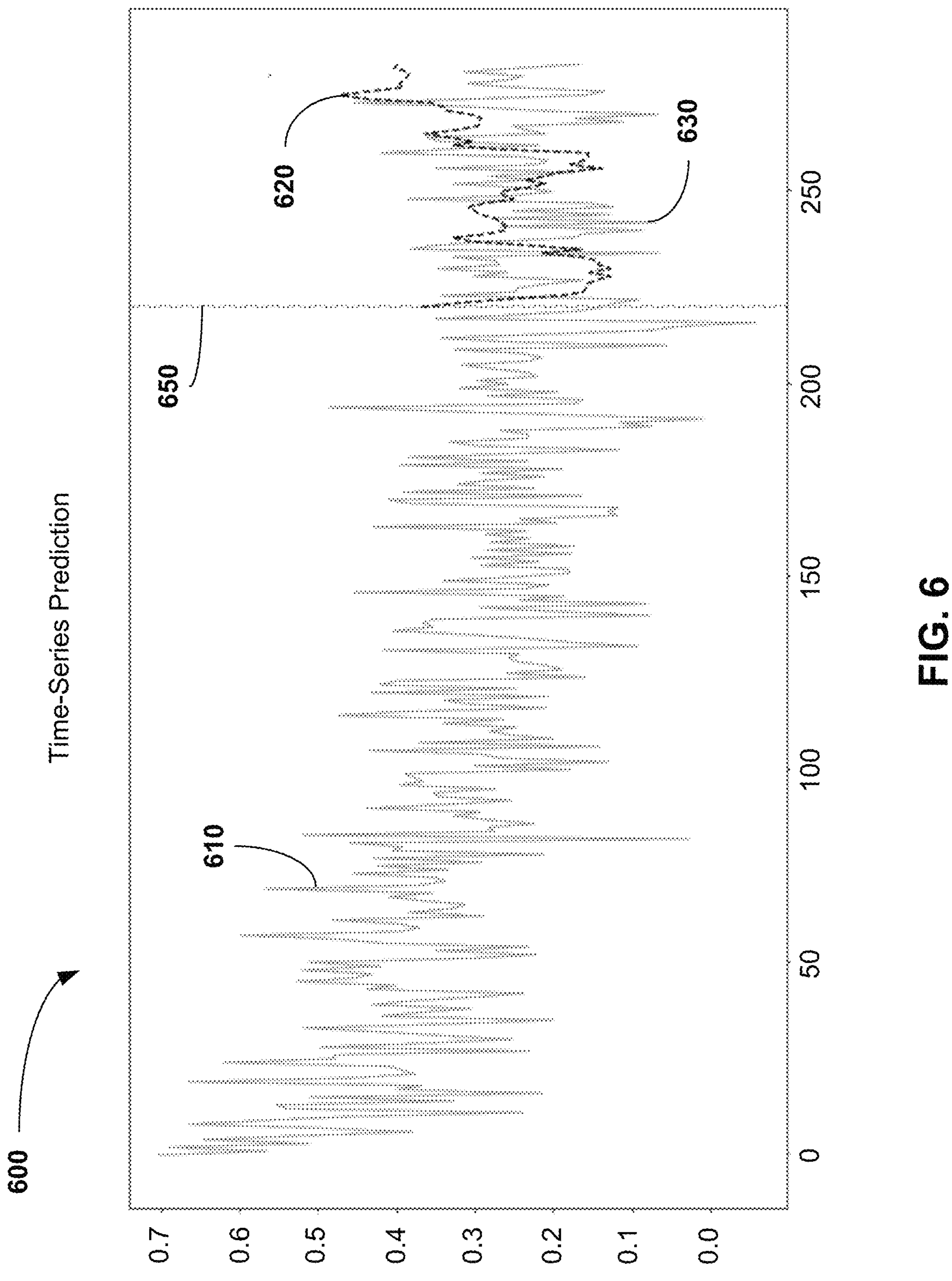
FIG. 6 illustrates, in a graph, an example of a time-series forecasting results using the uniform moving average technique.

FIG. 6 illustrates, in a diagram, an example of a time-series prediction 600 using the uniform moving average technique. The diagram shows the time series data 610 that was used to train the forecasting model. After a point in time 650, the ground truth time series data 630 during test time is displayed. Also displayed is the predicted (forecast) time series data 620.

Figure 7:
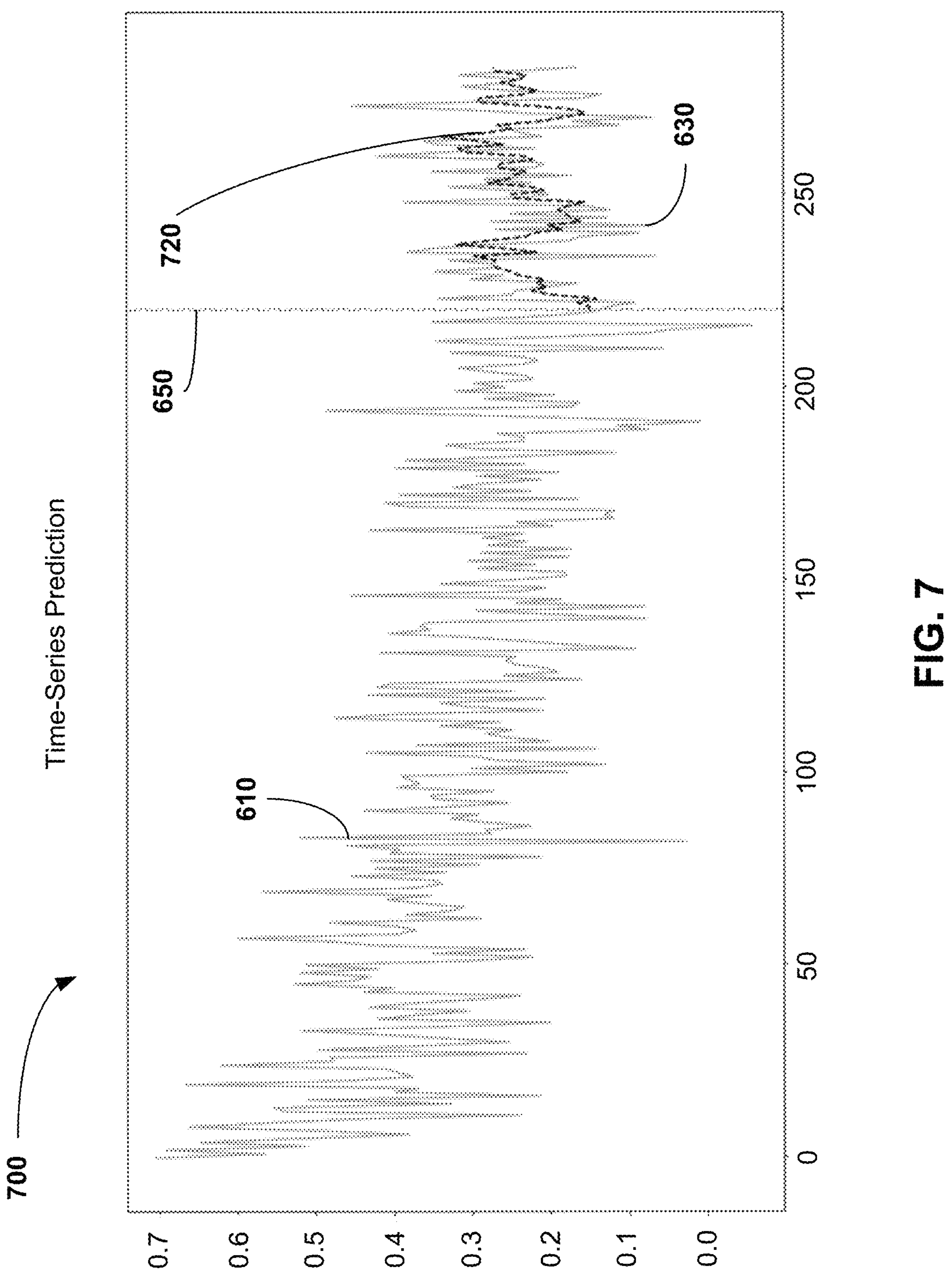
FIG. 7 illustrates, in a graph, an example of a time-series forecasting results using the dynamic neural moving average (MA) technique, in accordance with some embodiments.

FIG. 7 illustrates, in a diagram, an example of a time-series prediction 700 using the dynamic neural MA technique, in accordance with some embodiments. The training time series data 610, point in time 650 and ground truth time series data 630 during test time are displayed. Also displayed is the predicted (forecast) time series data 720. It should be noted that both the preprocessing and forecasting models are trained in the dynamic MA technique, as described above.

Two results are evident: 1) The dynamic neural MA method's forecast 720 matches the ground truth 630 better; and 2) the dynamic neural LOWESS method forecast 720 provides predictions with finer scale, i.e., there are more "zig-zag" in the new predictions. In other words, the dynamic neural LOWESS forecast 720 captures the auto-correlation better than the uniform moving average forecast 620.

In this example, one reason that dynamic neural MA forecast 720 is better than the uniform moving average forecast is due to the fact that the dynamic neural MA processing module can adapt to the streaming non-stationary time series better. Prior methods, such as uniform moving average, often make the assumption that the optimal processing does not change over time, i.e. they implicitly make a stationarity assumption on the underlying time series. However, real world data often are non-stationary. In fact, that is one reason data scientists need to retrain and maintain their models fairly frequently to maintain performance. Thus, dynamic neural MA forecasting can greatly reduce such work repetition, since the optimal processing selection is done automatically and learned by a neural network. In this sense, the dynamic neural MA method is more scalable across different time series and over time.

It should be noted that for time series that exhibit strong local trends, it is expected that using the dynamic neural LOWESS forecasting method describe above will result in an even more accurate predictions than dynamic neural MA or uniform moving average techniques.

In some embodiments, the methods described herein produce a software program that generates programs to combine time series processing and forecasting. This eases the typical workflow of current paradigms where a highly skilled machine learning scientists or engineers need to set certain hyper-parameters manually.

In some embodiments, the methods described herein are broadly applicable to any differentiable forecasting methods, moreover they can automatically balance the preprocessing module and the forecasting module dynamically depending on the input time series.

In some embodiments, the methods described herein work for the forecasting module: it avoids ad hoc preprocessing that optimizes criteria that are unrelated to time series forecasting.

Figure 8:
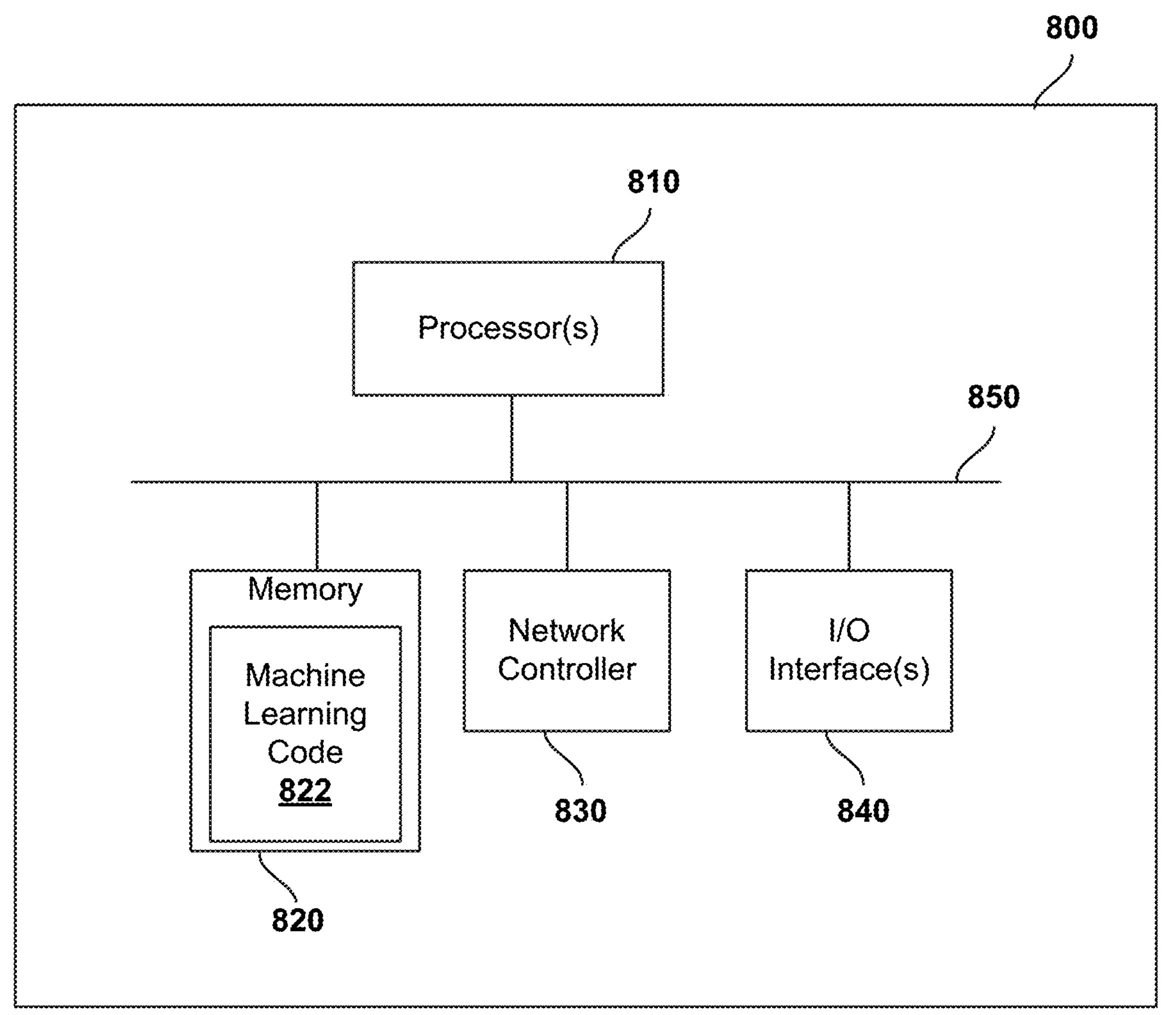
FIG. 8 is a block diagram of example hardware components of a computing device for neural time series preprocessing and forecasting.

System 100 and platform 300 for neural time series preprocessing and forecasting may be implemented as software and/or hardware, for example, in a computing device 800 as illustrated in FIG. 8. Methods 200, 400 or 500, in particular, one or more of blocks 201 to 205, blocks 402 to 406 or blocks 502 to 508, may be performed by software and/or hardware of a computing device such as computing device 800.

As illustrated, computing device 800 includes one or more processor(s) 810, memory 820, a network controller 830, and one or more I/O interfaces 840 in communication over bus 850.

Processor(s) 810 may be one or more Intel x86, Intel x64, AMD x86-64, PowerPC, ARM processors or the like.

Memory 820 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 830 serves as a communication device to interconnect the computing device with one or more computer networks such as, for example, a local area network (LAN) or the Internet.

One or more I/O interfaces 840 may serve to interconnect the computing device with peripheral devices, such as for example, keyboards, mice, video displays, and the like. Such peripheral devices may include a display of device 800. Optionally, network controller 830 may be accessed via the one or more I/O interfaces.

Software instructions are executed by processor(s) 810 from a computer-readable medium. For example, software may be loaded into random-access memory from persistent storage of memory 820 or from one or more devices via I/O interfaces 840 for execution by one or more processors 810. As another example, software may be loaded and executed by one or more processors 810 directly from read-only memory.

Example software components and data stored within memory 820 of computing device 800 may include software to identify transaction destinations, as described herein, and operating system (OS) software allowing for basic communication and application operations related to computing device 800.

Memory 820 may include machine learning code 822 with rules and models such as data preprocessing neural network 102 and forecasting neural network 104. Machine learning code 822 can refine based on learning. Machine learning code 822 can include instructions to implement an artificial neural network, such as data preprocessing neural network 102 and forecasting neural network 104.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for preprocessing and forecasting neural time series data, the system comprising:

at least one processor; and a memory comprising instructions which, when executed by the processor, configure the processor to:

generate a plurality of short time series data from a non-stationary time series data;

preprocess each of the plurality of short time series data using a data preprocessing neural network to generate a respective processed time series data, the data preprocessing neural network comprising a hyper neural network configured to receive the plurality of short time series data to dynamically generate preprocessing weight parameters which vary for each of the plurality of short time series data, the dynamically generated preprocessing weight parameters are weights utilized by the data preprocessing neural network to transform non-stationary data to more stationary data using a differencing transformation, the differencing transformation including computing differences between consecutive observations in the non-stationary data;

determine parameters of a forecasting neural network by optimizing a differentiable loss function based on output of the data preprocessing neural network, wherein parameters of the hyper neural network of the data preprocessing neural network and the parameters of the forecasting neural network are learned together in an end-to-end training process;

input the plurality of the respective processed time series data to the forecasting neural network to predict a next data point for the non-stationary time series data.

2. The system as claimed in claim 1, wherein the preprocessing weight parameters comprise:

a trained fixed component learned from the preprocessing neural network; and a dynamic component comprising the output of the hyper neural network.

3. The system as claimed in claim 1, wherein the at least one processor is configured to determine the parameters of the forecasting neural network via stochastic gradient descent or derivatives of the stochastic gradient descent.

4. The system as claimed in claim 1, wherein the parameters are outputs by a neural network and serve as short term memories that depend on the particular input time series.

5. The system as claimed in claim 1, wherein the data preprocessing neural network is configured to estimate moving weighted averages for each of the plurality of short time series data.

6. The system as claimed in claim 5, wherein the moving weighted averages comprise at least one of: moving mean, or moving standard deviation.

7. The system as claimed in claim 1, wherein the data preprocessing neural network is configured to perform local regression for each of the plurality of short time series data.

8. The system as claimed in claim 1, wherein the differencing technique is generalized from a kernel scheme or an autoregressive moving average (ARIMA)-based differencing scheme.

9. The system as claimed in claim 1, wherein the preprocessing of the plurality of short time series data is optimized for forecasting using the forecasting neural network.

10. The system as claimed in claim 1, wherein the forecasting neural network comprises a recurrent neural net (RNN), a long short-term memory (LSTM), or a temporal convolutional neural networks (CNN).

11. A computer-implemented method for neural time series preprocessing and forecasting, the method comprising:

generating a plurality of short time series data from a non-stationary time series data;

preprocessing each of the plurality of short time series data using a data preprocessing neural network to generate a respective processed time series data, the data preprocessing neural network comprising a hyper neural network configured to receive the plurality of short time series data to dynamically generate preprocessing weight parameters which vary for each of the plurality of short time series data, the dynamically generated preprocessing weight parameters are weights utilized by the data preprocessing neural network to transform non-stationary data to more stationary data using a differencing transformation including computing differences between consecutive observations in the non-stationary data;

determining parameters of a forecasting neural network by optimizing a differentiable loss function based on output of the data preprocessing neural network, wherein parameters of the hyper neural network of the data preprocessing neural network and the parameters of the forecasting neural network are learned together in an end-to-end training process;

inputting the plurality of the respective processed time series data to the forecasting neural network to predict a next data point for the non-stationary time series data.

12. The method as claimed in claim 11, wherein the preprocessing weight parameters comprise:

a trained fixed component learned from the preprocessing neural network; and a dynamic component comprising the output of the hyper neural network.

13. The method as claimed in claim 11, comprising determining the parameters of the forecasting neural network via stochastic gradient descent or derivatives of the stochastic gradient descent.

14. The method as claimed in claim 11, wherein the parameters are outputs by a neural network and serve as short term memories that depend on the particular input time series.

15. The method as claimed in claim 11, wherein the data preprocessing neural network estimates moving weighted averages for each of the plurality of short time series data.

16. The method as claimed in claim 15, wherein the moving weighted averages comprise at least one of: moving mean, or moving standard deviation.

17. The method as claimed in claim 11, wherein the data preprocessing neural network performs local regression for each of the plurality of short time series data.

18. The method as claimed in claim 11, wherein the differencing technique is generalized from a kernel scheme or an autoregressive moving average (ARIMA)-based differencing scheme.

19. The method as claimed in claim 11, wherein the preprocessing of the plurality of short time series data is optimized for forecasting using the forecasting neural network.

20. The method as claimed in claim 11, wherein the forecasting neural network comprises a recurrent neural net (RNN), a long short-term memory (LSTM), or a temporal convolutional neural networks (CNN).

* * * * *